United States Patent
Kokusho et al.

(10) Patent No.: US 10,381,939 B2
(45) Date of Patent: Aug. 13, 2019

(54) SWITCH DRIVE CIRCUIT AND SWITCHING POWER SUPPLY DEVICE USING SAME

(71) Applicants: Rohm Co., Ltd., Kyoto (JP); TDK Corporation, Tokyo (JP)

(72) Inventors: Yuichi Kokusho, Kyoto (JP); Takuya Sakamoto, Tokyo (JP)

(73) Assignees: Rohm Co., Ltd., Kyoto (JP); TDK Corporation, Tokyo (JP)

( * ) Notice: Subject to any disclaimer, the term of this patent is extended or adjusted under 35 U.S.C. 154(b) by 5 days.

(21) Appl. No.: 15/679,202

(22) Filed: Aug. 17, 2017

(65) Prior Publication Data
US 2018/0076713 A1   Mar. 15, 2018

(30) Foreign Application Priority Data
Sep. 14, 2016   (JP) .................. 2016-179267

(51) Int. Cl.
*H02M 1/38* (2007.01)
*H02M 3/337* (2006.01)
*H02M 3/335* (2006.01)
*H02M 1/40* (2007.01)
*H02M 1/00* (2006.01)

(52) U.S. Cl.
CPC ......... *H02M 3/33592* (2013.01); *H02M 1/38* (2013.01); *H02M 1/40* (2013.01); *H02M 3/3376* (2013.01); *H02M 2001/0058* (2013.01)

(58) Field of Classification Search
CPC ......... H02M 2001/0058; H02M 1/083; H02M 1/088; H02M 3/335; H02M 3/33546; H02M 3/33569; H02M 3/33592
See application file for complete search history.

(56) References Cited

U.S. PATENT DOCUMENTS

| | | | | |
|---|---|---|---|---|
| 2007/0030717 A1* | 2/2007 | Luger | ................ | H02J 7/35 |
| | | | | 363/132 |
| 2010/0020569 A1* | 1/2010 | Melanson | ................ | H01F 3/10 |
| | | | | 363/21.03 |
| 2013/0063185 A1* | 3/2013 | Ye | ................ | H02M 3/33569 |
| | | | | 327/108 |
| 2014/0140106 A1* | 5/2014 | Duan | ................ | H02M 3/33592 |
| | | | | 363/21.06 |
| 2014/0146574 A1* | 5/2014 | Worek | ................ | H02M 3/3376 |
| | | | | 363/17 |

(Continued)

FOREIGN PATENT DOCUMENTS

JP         2013-055858        3/2013

*Primary Examiner* — Fred E Finch, III
(74) *Attorney, Agent, or Firm* — Fish & Richardson P.C.

(57) ABSTRACT

A switch drive circuit drives a full-bridge output stage connected to a transformer to alternately switch between a first cycle in which a current in a first direction is supplied to the transformer and a second cycle in which a current in a second direction is supplied to the transformer. The switch drive circuit includes a mode in which a dead time of the output stage is set in accordance with a magnitude of a current flown in one of the first and second cycles, the dead time becoming an operation changing factor in the other cycle. Or, the switch drive circuit includes a mode in which the dead time of the output stage is set in accordance with a magnitude of an average current obtained by averaging currents flown in the first and second cycles. Or, the switch drive circuit switches between these modes in accordance with a signal.

18 Claims, 9 Drawing Sheets

(56) References Cited

U.S. PATENT DOCUMENTS

| | | | | |
|---|---|---|---|---|
| 2014/0226369 A1* | 8/2014 | Kimura | ............... | H02M 3/3376 363/21.09 |
| 2014/0376275 A1* | 12/2014 | Ohashi | .................... | H02M 1/38 363/21.02 |
| 2015/0155792 A1* | 6/2015 | Yonezawa | ......... | H02M 3/33592 363/21.1 |
| 2015/0318784 A1* | 11/2015 | Wu | ....................... | H02M 3/158 323/283 |
| 2016/0072390 A1* | 3/2016 | Akutagawa | ....... | H02M 3/33584 363/17 |
| 2016/0087543 A1* | 3/2016 | Jin | ......................... | H02M 1/38 363/21.03 |
| 2016/0111964 A1* | 4/2016 | Oki | .................... | H02M 3/3378 363/21.02 |
| 2017/0317599 A1* | 11/2017 | Satoh | ................. | H02M 3/33523 |
| 2018/0054136 A1* | 2/2018 | Jimichi | .................. | H02M 1/08 |

* cited by examiner

SWITCH DRIVE CIRCUIT AND SWITCHING POWER SUPPLY DEVICE USING SAME

CROSS-REFERENCE TO RELATED APPLICATIONS

This application is based on Japanese Patent No. 2016-179267 filed on Sep. 14, 2016, the contents of which are hereby incorporated by reference.

BACKGROUND OF THE INVENTION

1. Field of the Invention

The invention disclosed herein relates to a switch drive circuit and a switching power supply device using the same.

2. Description of Related Art

Conventionally, switching power supply devices using a full-bridge output stage have been widely used as power supply means in applications where conversion of a large direct current (DC) is required.

An example of conventional technology related to this is disclosed in Japanese Patent Application Publication No. 2013-055858.

However, the conventional switching power supply devices are disadvantageous in that magnetic deviation of a transformer is caused due to variation in characteristics of switching devices in the full-bridge output stage.

SUMMARY OF THE INVENTION

In view of the above-described problem found by the inventors of the present application, the present invention aims at providing a switch drive circuit that is capable of moderating magnetic deviation of a transformer and a switching power supply device using such a switch drive circuit.

According to an embodiment disclosed herein, a switch drive circuit drives a full-bridge output stage connected to a transformer to alternately switch between a first cycle in which an excitation current in a first direction is supplied to the transformer and a second cycle in which an excitation current in a second direction is supplied to the transformer. Here, a simultaneous OFF time of the full-bridge output stage is set in accordance with a magnitude of an excitation current flown in one of the first cycle and the second cycle, the simultaneous OFF time becoming an operation changing factor in the other of the first cycle and the second cycle.

According to another embodiment disclosed herein, a switch drive circuit drives a full-bridge output stage connected to a transformer to alternately switch between a first cycle in which an excitation current in a first direction is supplied to the transformer and a second cycle in which an excitation current in a second direction is supplied to the transformer. Here, a simultaneous OFF time of the full-bridge output stage may be set in accordance with a magnitude of an average excitation current obtained by averaging an excitation current flown in the first cycle and an excitation current flown in the second cycle.

According to still another embodiment disclosed herein, a switch drive circuit drives a full-bridge output stage connected to a transformer to alternately switch between a first cycle in which an excitation current in a first direction is supplied to the transformer and a second cycle in which an excitation current in a second direction is supplied to the transformer. Here, the switch drive circuit may include a mode in which a simultaneous OFF time of the full-bridge output stage at a time of shifting to one of the first cycle and the second cycle is set in accordance with a magnitude of an excitation current flown in the other of the first cycle and the second cycle; and a mode in which a simultaneous OFF time of the full-bridge output stage is set according to a magnitude of an average excitation current obtained by averaging an excitation current flown in the first cycle and an excitation current flown in the second cycle. Here, switching between modes may be performed in accordance with a mode switching signal.

Other features, constituent components, operational steps, advantages, and characteristics of the present invention will be further clarified by the following detailed descriptions of best modes and accompanying drawings related thereto.

BRIEF DESCRIPTION OF THE DRAWINGS

Switching Power Supply Device (First Embodiment)

Figure 1:
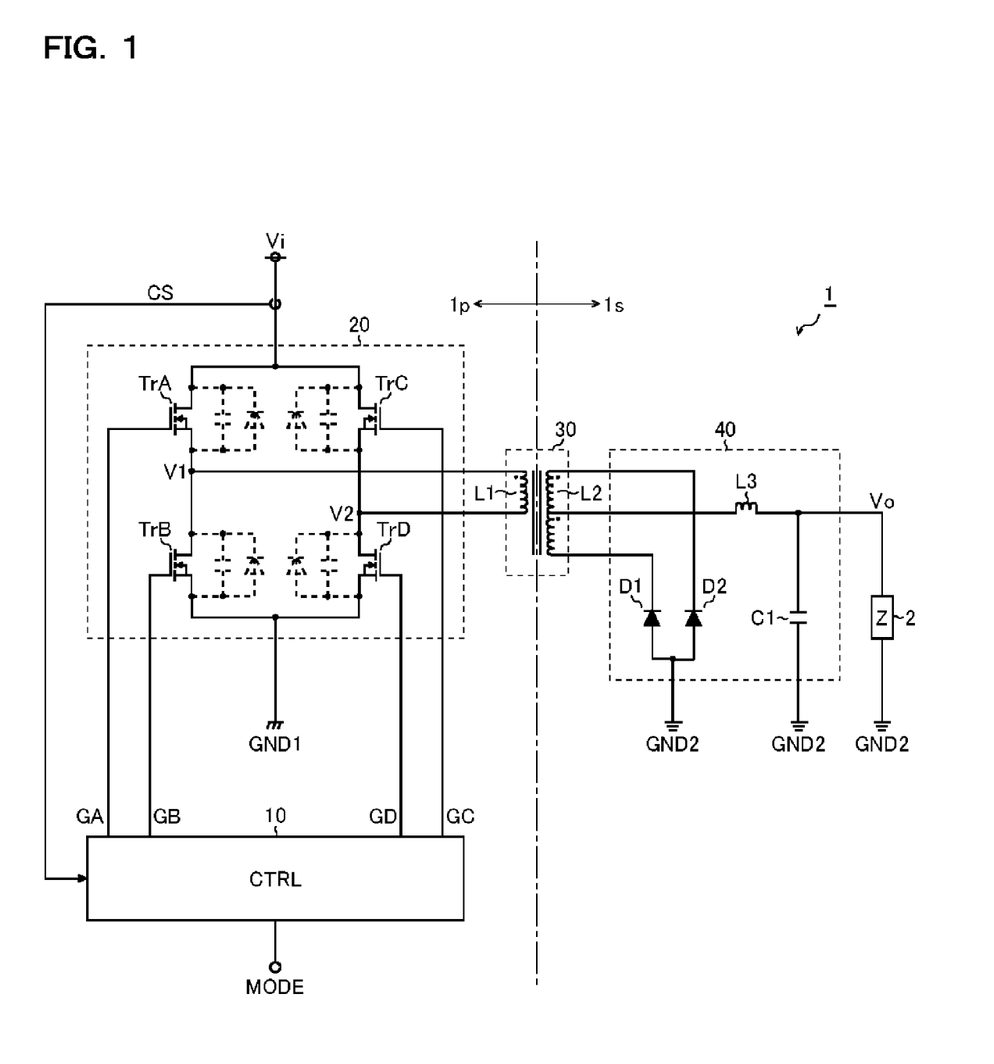
FIG. 1 is a circuit diagram showing a first embodiment of a switching power supply device.

FIG. 1 is a circuit diagram showing a first embodiment of a switching power supply device. The switching power supply device 1 of the present embodiment is an insulating DC/DC converter that generates an output voltage Vo from an input voltage Vi to supply the output voltage Vo to a load 2, and includes a switch drive circuit 10, a full-bridge output stage 20, a transformer 30, and a rectifying-smoothing unit 40.

The switch drive circuit 10 pulse-drives gate signals (GA, GB, GC, and GD) so as for the output voltage Vo to reach a target level, and thereby PWM (pulse width modulation) drives the full-bridge output stage 20 in a phase shift method. Further, the switch drive circuit 10 accepts input of a sense signal CS in accordance with a drive current of the full-bridge output stage 20 (and thus an excitation current of the transformer 30), and is also provided with a function of setting a simultaneous OFF time (also known as a dead time) of the full-bridge output stage 20 in accordance with the sense signal CS. Furthermore, the switch drive circuit 10 is also provided with a function of switching the method for setting the simultaneous OFF time in accordance with an operation mode switching signal MODE. Specific operation of the switch drive circuit 10 will be described later in detail.

The full-bridge output stage 20 is connected between a power supply terminal (=an input-voltage-Vi application terminal) and a first ground terminal (=a ground-voltage- GND1 application terminal), and generates the output voltage Vo from the input voltage Vi in accordance with ON/OFF control of upper switches TrA and TrC and lower switches TrB and TrD.

The upper switch TrA and the lower switch TrB are serially connected between the power supply terminal and the first ground terminal as a first arm (=a first half bridge) of the full-bridge output stage 20. Here, a connection node (=a node-voltage-V1 application terminal) between the upper switch TrA and the lower switch TrB is connected to a first input terminal (=a first terminal of a primary winding L1) of the transformer 30.

The upper switch TrC and the lower switch TrD are serially connected between the power supply terminal and the first ground terminal as a second arm (=a second half bridge) of the full-bridge output stage 20. Here, a connection node (=a node-voltage-V2 application terminal) between the upper switch TrC and the lower switch TrD is connected to a second input terminal (=a second terminal of the primary winding L1) of the transformer 30.

As shown by broken lines in the figure, the switches TrA to TrD are each accompanied by a parasitic capacitor and a parasitic diode, both appearing between two terminals of each of the switches TrA to TrD.

The upper switch TrA and the lower switch TrB are complementarily turned ON/OFF in accordance with the gate signals GA and GB, respectively. The upper switch TrC and the lower switch TrD are each complementarily turned ON/OFF according to the gate signals GC and GD. In the present specification, the term "complementarily" can be thought to cover not only a case where the ON/OFF states of the switching elements are completely reversed, but also a case where a delay is given to the ON/OFF shifting of upper and lower switches (that is, a simultaneous OFF time (dead time) is set in which they are simultaneously OFF).

The simultaneous OFF time is set not only for the purpose of preventing an excessive shoot-through current from flowing via the upper and lower switches, but also for the purpose of achieving soft switching operation (zero-volt switching (ZVS) operation) to reduce switching loss and switching noise.

Here, in a case where a high voltage is applied to the upper switches TrA and TrC and the lower switches TrB and TrD, it is desirable to use, as each of the switch elements, a power metal-oxide-semiconductor field effect transistor (MOSFET), an insulated gate bipolar transistor (IGBT), an SiC transistor, or a high voltage resistant switch element such as a GaN power device.

The transformer 30 includes the primary winding L1 and a secondary winding L2, which are electromagnetically coupled to each other, and transfers alternating current (AC) power from a primary circuit system 1p to a secondary circuit system is while electrically insulating the primary circuit system 1p (GND1 system) and the secondary circuit system is (GND2 system) from each other.

The rectifying-smoothing unit 40 constitutes a function block that generates the output voltage Vo from an induction voltage that appears in the secondary winding L2 of the transformer 30, and includes rectifier diodes D1 and D2 (corresponding to a first rectifier and a second rectifier, respectively), a choke coil L3, and a smoothing capacitor C1.

A cathode of the rectifier diode D1 is connected to a first output terminal (=a first terminal of the secondary winding L2) of the transformer 30. On the other hand, a cathode of the rectifier diode D2 is connected to a second output terminal (=a second terminal of the secondary winding L2) of the transformer 30. Anodes of the rectifier diodes D1 and D2 are both connected to a second ground terminal (=a ground-voltage-GND2 application terminal. A first terminal of the choke coil L3 is connected to a middle point tap of the secondary winding L2. A second terminal of the choke coil L3 and a first terminal of the smoothing capacitor C1 are both connected to an output-voltage-Vo output terminal. A second terminal of the smoothing capacitor C1 is connected to the ground-voltage-GND2 application terminal.

Basic Operation

Figure 2:
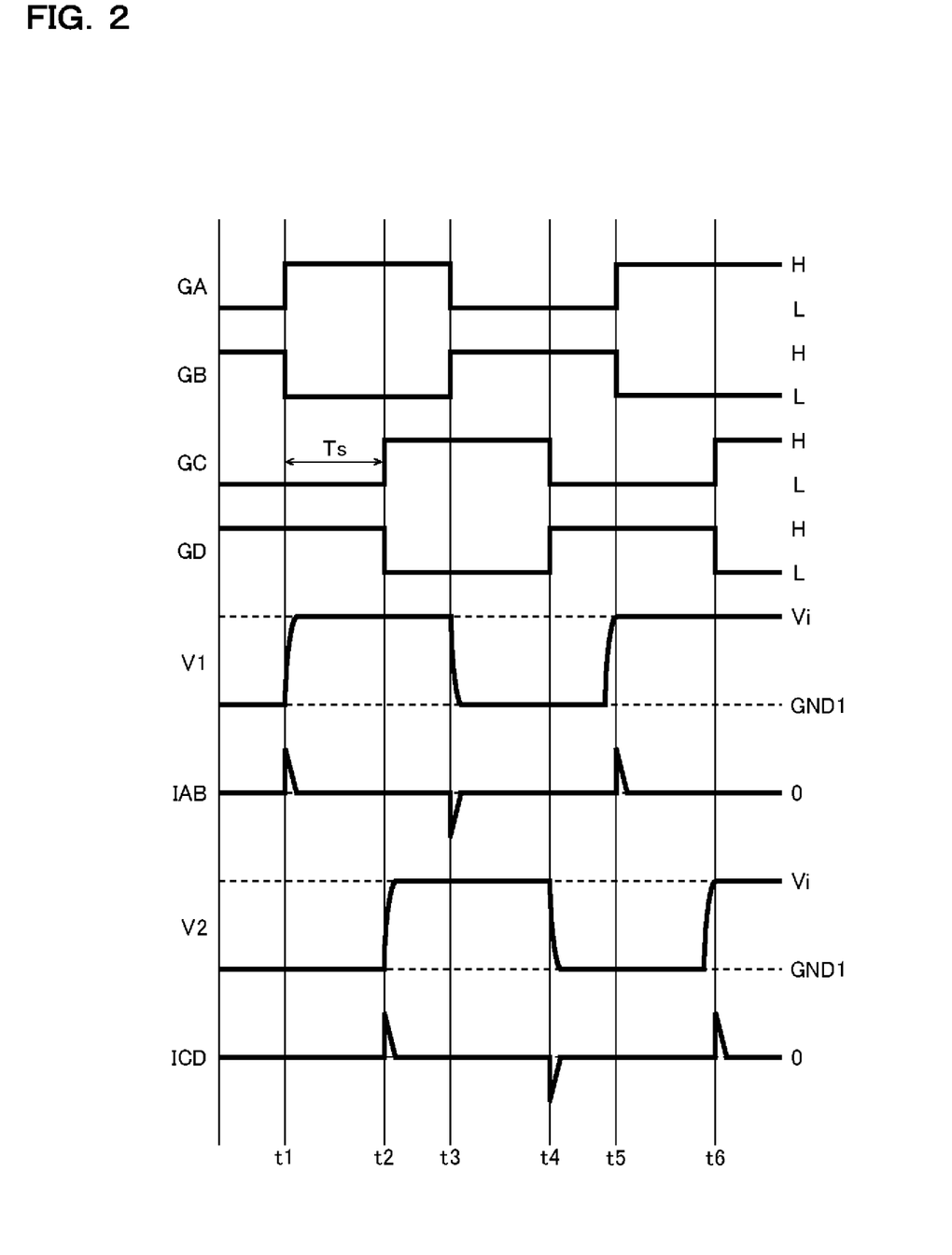
FIG. 2 is a timing chart showing an example of a phase shift method.

FIG. 2 is a timing chart showing PWM driving of the full-bridge output stage 20 performed by means of a phase shift method. The figure illustrates, in order from the top, the gate signals GA to GD, a node voltage V1, a shoot-through current IAB (=a shoot-through current which flows via the upper switch TrA and the lower switch TrB, a node voltage V2, and a shoot-through current ICD (=a shoot-through current which flows via the upper switch TrC and the lower switch TrD).

In the PWM driving of the full-bridge output stage 20 performed by means of the phase shift method, the gate signals GA to GD are each pulse-driven at a constant duty (50%). A shift time Ts (a phase difference) is provided between gate signals GA and GB on the first arm side and between gate signals GC and GD on the second arm side. A variable control of the shift time Ts makes it possible to control an application time during which the input voltage Vi is applied to the first winding L1, and this makes it possible to perform feedback control of the output voltage Vo with a fixed, constant switching frequency.

Figure 3:
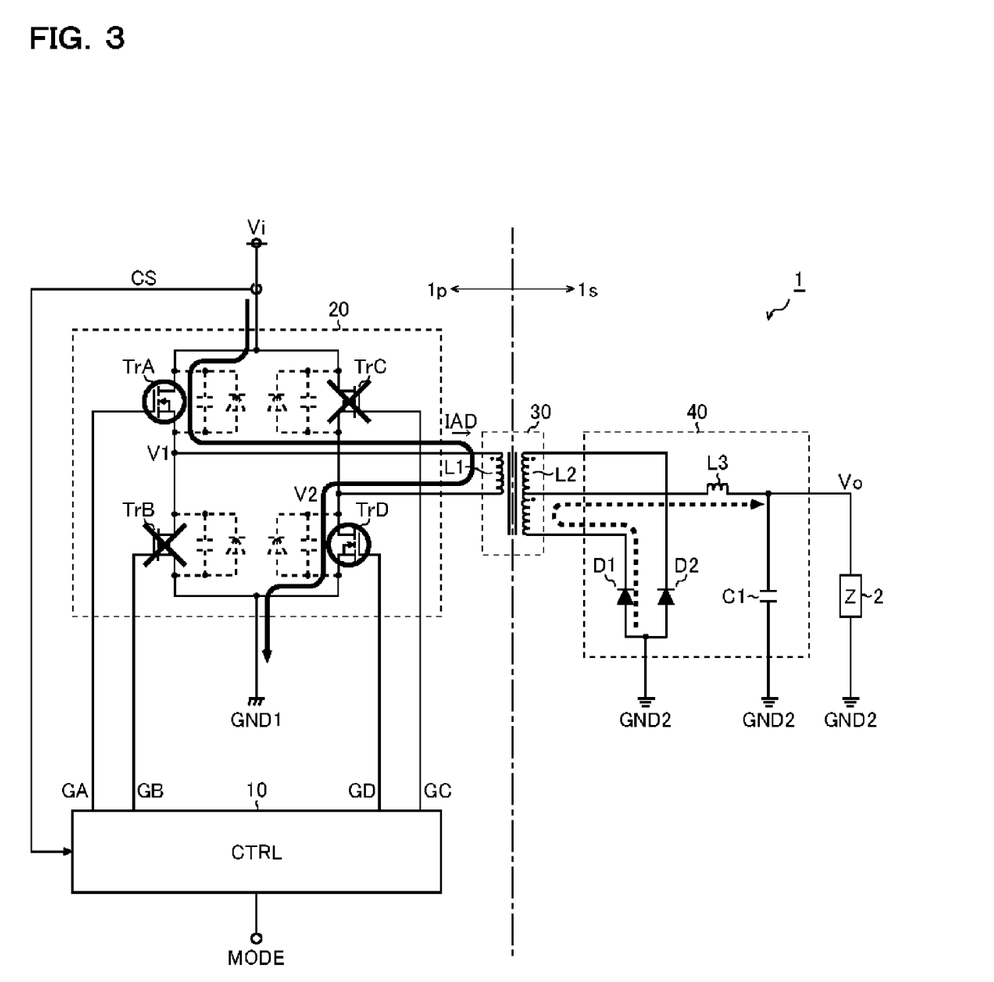
FIG. 3 is a current path diagram of a first cycle.

For example, from time t1 to time t2, the gate signals GA and GD are high level, and the gate signals GB and GC are low level. Accordingly, the upper switch TrA and the lower switch TrD are turned on, and the lower switch TrB and the upper switch TrC are turned off. As a result, an excitation current IAD in a first direction flows in the first circuit system 1p via a current path Vi→TrA→L1→TrD→GND1 as indicated by a thick solid line and arrow in FIG. 3. In the second circuit system 1s, an induction current flows via a current path GND2→D1→L2→L3 as indicated by a thick broken line and arrow in FIG. 3. In the following descriptions, an operation state in which the excitation current IAD in the first direction is supplied to the transformer 30 by the upper switch TrA and the lower switch TrD being turned on will be referred to as a "first cycle."

Figure 4:
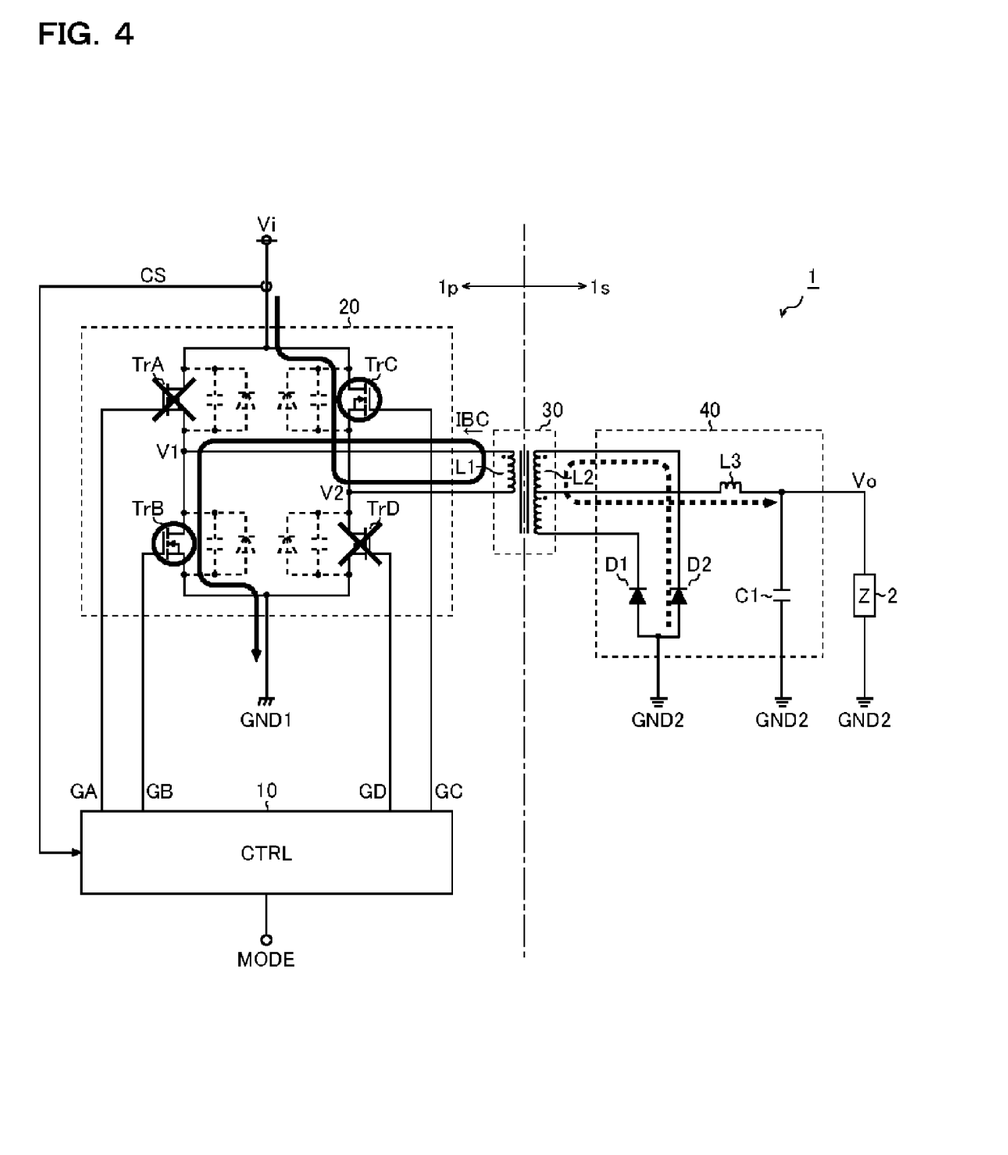
FIG. 4 is a current path diagram of a second cycle.

On the other hand, from time t3 to time t4, the gate signals GA and GD are low level, and the gate signals GB and GC are high level. Accordingly, the upper switch TrA and the lower switch TrD are turned off, and the lower switch TrB and the upper switch TrC are turned on. As a result, an excitation current IBC in a second direction flows in the first circuit system 1p via a current path Vi→TrC→L1→TrB→GND1 as indicated by a thick solid line and arrow in FIG. 4. In the second circuit system 1s, an induction current flows via a current path GND2→D2→L2→L3 as indicated by a thick broken line and arrow in FIG. 4. In the following descriptions, an operation state in which the excitation current IBC in the second direction is supplied to the transformer 30 by the upper switch TrC and the lower switch TrB being turned on will be referred to as a "second cycle."

Thus, the switch drive circuit 10 drives the full-bridge output stage 20 to alternately switch between the first cycle, in which the upper switch TrA and the lower switch TrD are turned on to supply the excitation current IAD in the first direction to the transformer 30, and the second cycle, in which the upper switch TrC and the lower switch TrB are turned on to supply the excitation current IBC in the second direction to the transformer 30.

The full-bridge output stage 20 can take various operation states in addition to the above-described first and second cycles. For example, from time t2 to time t3, the upper switches TrA and TrC are turned on, and the lower switches TrB and TrD are turned off. Further, from time t4 to time t5, the upper switches TrA and TrC are turned off, and the lower switches TrB and TrD are turned on. Given this fact, the above-described term "alternately" can be thought to also cover a case where another operation state takes place between the first and second cycles.

In the example shown in FIG. 2, the shoot-through current IAB is generated at logic switching timing of the gate signals GA and GB, and the shoot-through current ICD is generated at logic switching timing of the gate signals GC and GD. To reduce the thus generated shoot-through currents IAB and ICD, it is necessary not only to shift the logic switching timing of the gate signal GA and that of the gate signal GB from each other to provide a simultaneous OFF time during which the upper switch TrA and the lower switch TrB are simultaneously off, but also to shift the logic switching timing of the gate signal GC and that of the gate signal GD from each other to provide a simultaneous OFF time during which the upper switch TrC and the lower switch TrD are simultaneously off.

Here, as already mentioned above, the switch drive circuit 10 has the function of setting the simultaneous OFF time of the full-bridge output stage 20 in accordance with the sense signal CS (and thus the magnitude of the excitation current IAD or IBC). The switch drive circuit 10 is also provided with the function of switching a method for setting the simultaneous OFF time (operation mode) in accordance with the operation mode switching signal MODE.

Thus, hereinafter, the dead time setting processing performed by the switch drive circuit 10 will be described in detail with specific examples.

Dead Time Setting Processing (First Mode)

Figure 5:
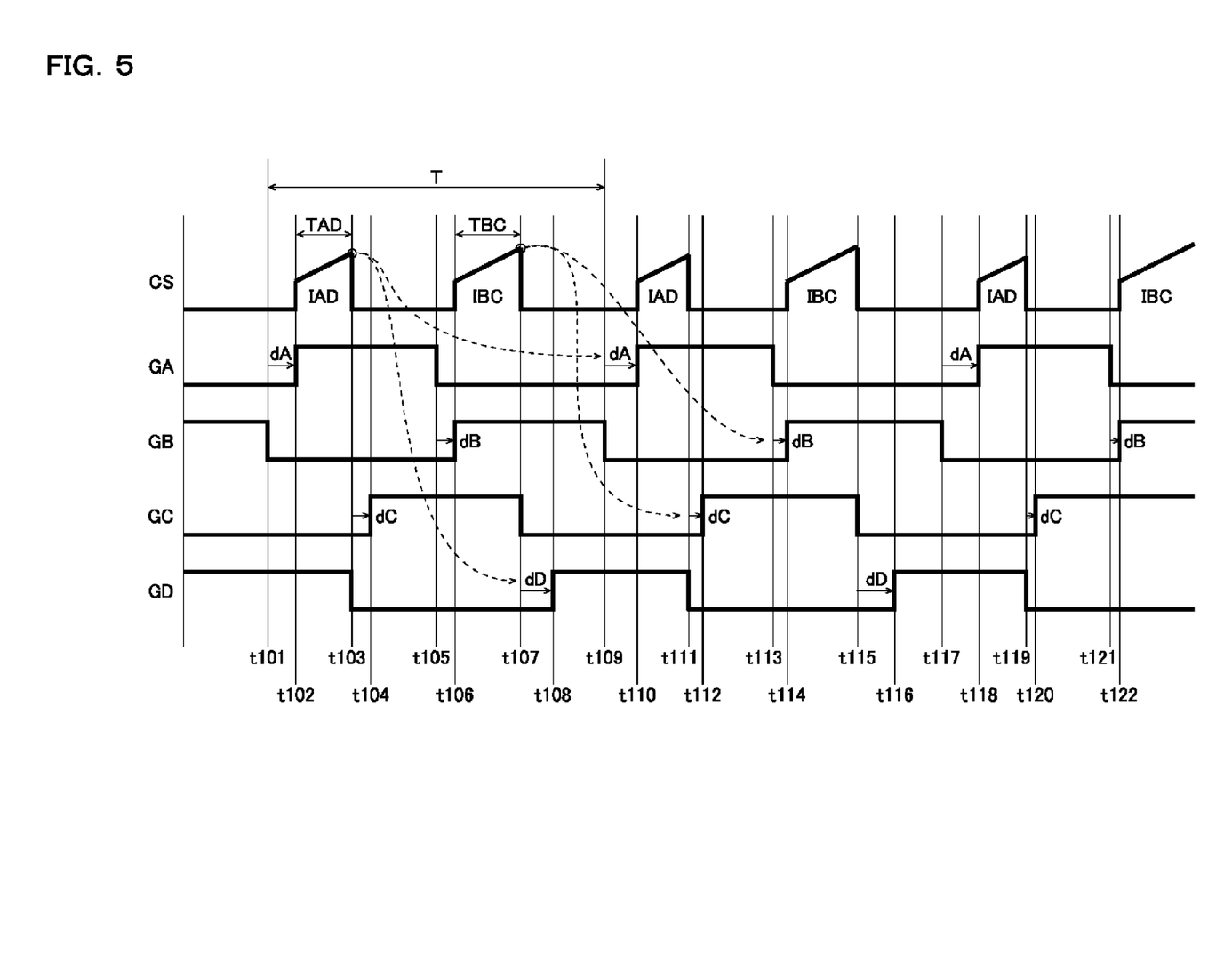
FIG. 5 is a timing chart showing dead-time setting processing in a first mode.

FIG. 5 is a timing chart which shows the dead time setting processing in a first mode (MODE "01"), and the figure illustrates, in order from the top, the sense signal CS and the gate signals GA to GD. In this figure, for convenience of description, behaviors of the signals are illustrated without considering a leakage inductance component of the transformer 30.

As already described above, the switch drive circuit 10 drives the full-bridge output stage 20 to alternately switch between the first cycle, in which the excitation current IAD is outputted, and the second cycle, in which the excitation current IBC is outputted.

The switch drive circuit 10 in the first mode sets simultaneous OFF times dA and dD in accordance with the magnitude of the excitation current IAD which has flown in the first cycle (for example from time t102 to time t103) in a period (for example, from time t101 to time t109), the simultaneous OFF times dA and dD becoming operation changing factors in the first cycle (for example, from time t110 to time t111) in the next period. The simultaneous OFF time dA corresponds to a delay time (for example, from time t109 to time t110) between a fall of the gate signal GB to a low level and a rise of the gate signal GA to a high level, and the simultaneous OFF time dD corresponds to a delay time (for example, from time t107 to time t108) between a fall of the gate signal GC to a low level and a rise of the gate signal GD to a high level. Here, the larger the excitation current IAD is, the shorter the switch drive circuit 10 makes the simultaneous OFF times dA and dD (that is, the wider the switch drive circuit 10 makes fixed duties of the gate signals GA and GD in one period), and the smaller the excitation current IAD is, the longer the switch drive circuit 10 makes the simultaneous OFF times dA and dD (that is, the narrower the switch drive circuit 10 makes the fixed duties of the gate signals GA and GD).

Likewise, the switch drive circuit 10 in the first mode sets simultaneous OFF times dB and dC in accordance with the magnitude of the excitation current IBC which has flown in the second cycle (for example from time t106 to time t107) in a period (for example from time t101 to time t109), simultaneous OFF times dB and dC becoming operation changing factors in the second cycle (for example, from time t114 to time t115) in the next period. The simultaneous OFF time dB corresponds to a delay time (for example, from time t113 to time t114) between a fall of the gate signal GA to a low level and a rise of the gate signal GB to a high level, and the simultaneous OFF time dC corresponds to a delay time (for example, from time t111 to time t112) between a fall of the gate signal GD to a low level and a rise of the gate signal GC to a high level. Here, the larger the excitation current IBC is, the shorter the switch drive circuit 10 makes the simultaneous OFF times dB and dC (that is, the wider the switch drive circuit 10 makes fixed duties of the gate signals GB and GC in one period), and the smaller the excitation current IBC is, the longer the switch drive circuit 10 makes the simultaneous OFF times dB and dC (that is, the narrower the switch drive circuit 10 makes the fixed duties of the gate signals GB and GC).

Thus, in the first mode, the dead time setting processing (IAD→dA and dD) on the first cycle side and the dead time setting processing (IBC→dB and dC) on the second cycle side are performed independently of each other. With this feature, if a relative difference is unintendedly caused between the excitation current IAD and the excitation current IBC due to variation in characteristics (such as gate delay difference) among the switches TrA to TrD, the above-performed dead time setting processing acts to increase the relative difference, and may contribute to magnetic deviation of the transformer 30.

For example, let us consider a case where the variation in characteristics among the switches TrA to TrD has caused the excitation current IAD in the first cycle to become relatively smaller as compared with the excitation current IBC in the second cycle. In this case, in the dead time setting processing in the first mode, the simultaneous OFF times dA and dD at the time of shifting to the first cycle is set to be relatively longer as compared with the simultaneous OFF times dB and dC at the time of shifting to the second cycle. Accordingly, a PWM duty (=TAD/T) in the first cycle becomes relatively lower than a PWM duty (=TBC/T) in the second cycle. As a result, the excitation current IAD decreases while the excitation current IBC increases, and thus the difference between them becomes larger than that in the previous period.

If such a vicious cycle causes promoted magnetic deviation of the transformer 30, it will prevent normal operation of the switching power supply device 1, which makes it impossible to generate the desired output voltage Vo from the input voltage Vi. To prevent this inconvenience, it can be said that it is desirable, when selecting the first mode (MODE="01"), to use, as the switches TrA to TrD, switch elements among which variation in characteristics is small, or to provide sufficient measures for preventing the magnetic deviation of the transformer 30.

Dead Time Setting Processing (Second Mode)

Figure 6:
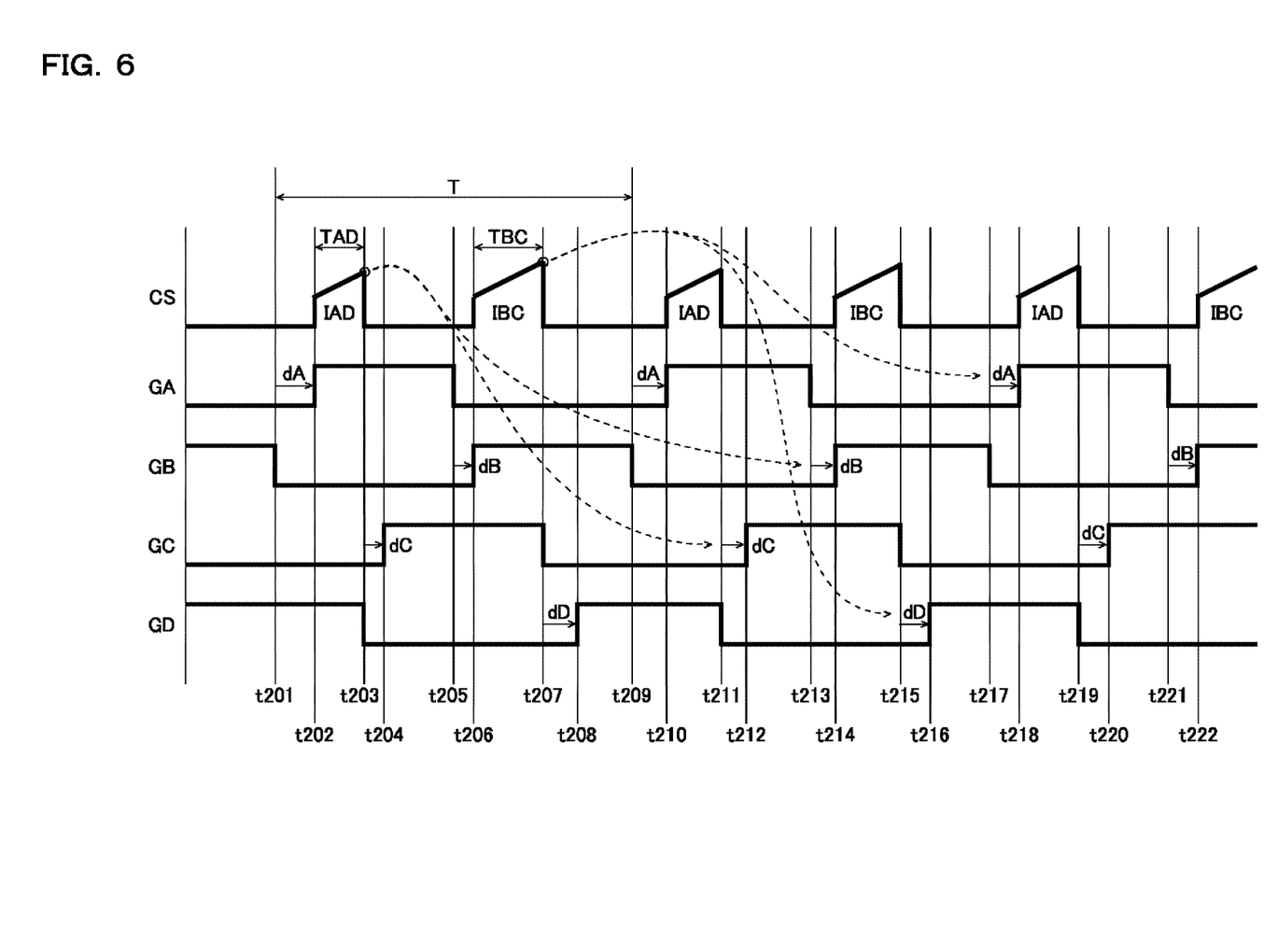
FIG. 6 is a timing chart showing dead-time setting processing in a second mode.

FIG. 6 is a timing chart which shows the dead time setting processing in a second mode (MODE="02"), and the figure illustrates, in order from the top, the sense signal CS and the gate signals GA to GD. In this figure as well, for convenience of description, behaviors of the signals are illustrated without considering the leakage inductance component of the transformer 30.

The switch drive circuit 10 in the second mode sets simultaneous OFF times dB and dC in accordance with the magnitude of the excitation current IAD which has flown in the first cycle (for example from time t202 to time t203) in a period, the simultaneous OFF times dB and dC becoming operation changing factors in the second cycle (for example, from time t214 to time t215) in the next period. The simultaneous OFF time dB corresponds to a delay time (for example, from time t213 to time t214) between a fall of the gate signal GA to a low level and a rise of the gate signal GB to a high level, and the simultaneous OFF time dC corresponds to a delay time (for example, from time t211 to time t212) between a fall of the gate signal GD to a low level and a rise of the gate signal GC to a high level. Here, the larger the excitation current IAD is, the shorter the switch drive circuit 10 makes the simultaneous OFF times dB and dC (that is, the wider the switch drive circuit 10 makes fixed duties of the gate signals GB and GC in one period), and the smaller the excitation current IAD is, the longer the switch drive circuit 10 makes the simultaneous OFF times dB and dC (that is, the narrower the switch drive circuit 10 makes the fixed duties of the gate signals GB and GC).

Likewise, the switch drive circuit 10 in the second mode sets simultaneous OFF times dA and dD in accordance with the magnitude of the excitation current IBC which has flown in the second cycle (for example from time t206 to time t207) in a period, the simultaneous OFF times dA and dD becoming operation changing factors in the first cycle (for example, from time t218 to time t219) in the next period. The simultaneous OFF time dA corresponds to a delay time (for example, from time t217 to time t218) between a fall of the gate signal GB to a low level and a rise of the gate signal GA to a high level, and the simultaneous OFF time dD corresponds to a delay time (for example, from time t215 to time t216) between a fall of the gate signal GC to a low level and a rise of the gate signal GD to a high level. Here, the larger the excitation current IBC is, the shorter the switch drive circuit 10 makes the simultaneous OFF times dA and dD (that is, the wider the switch drive circuit 10 makes fixed duties of the gate signals GA and GD in one period), and the smaller the excitation current IBC is, the longer the switch drive circuit 10 makes the simultaneous OFF times dA and dD (that is, the narrower the switch drive circuit 10 makes the fixed duties of the gate signals GA and GD).

Thus, in the second mode, the simultaneous OFF times of the full-bridge output stage 20 in one of the first and second cycles are set in accordance with the magnitude of the excitation current that has flown in the other of the first and second cycles. With this feature, even if a relative difference is unintendedly caused between the excitation current IAD and the excitation current IBC due to variation in characteristics (such as gate delay difference) among the switches TrA to TrD, the above-performed dead time setting processing acts to decrease the relative difference, and this makes it possible to reduce magnetic deviation of the transformer 30.

For example, let us consider a case where the variation in characteristics among the switches TrA to TrD has caused the excitation current IAD in the first cycle to become relatively smaller than the excitation current IBC in the second cycle. In this case, in the dead time setting processing in the second mode, the simultaneous OFF times dA and dD at the time of shifting to the first cycle is set to be relatively shorter than the simultaneous OFF times dB and dC at the time of shifting to the second cycle. Accordingly, the PWM duty (=TAD/T) in the first cycle becomes relatively higher than the PWM duty (=TBC/T) in the second cycle. As a result, the excitation current IAD increases while the excitation current IBC decreases, and thus the difference between these currents becomes smaller than in the previous period.

Thus, selection of the second mode (MODE="02") makes it possible to reduce magnetic deviation of the transformer 30 even without using switch elements among which variation in characteristics is small or additionally providing measures to prevent the magnetic deviation of the transformer 30.

In the example shown in the figure, considering the fact that it takes some time from the acquisition of an excitation current to the completion of the setting of the simultaneous OFF times, the acquisition of the excitation current and the setting of the simultaneous OFF times are avoided between adjacent first and second cycles; however, if the processing can be done in time, the acquisition of the excitation current and the setting of the simultaneous OFF times may be performed between adjacent first and second cycles.

Dead Time Setting Processing (Third Mode)

Figure 7:
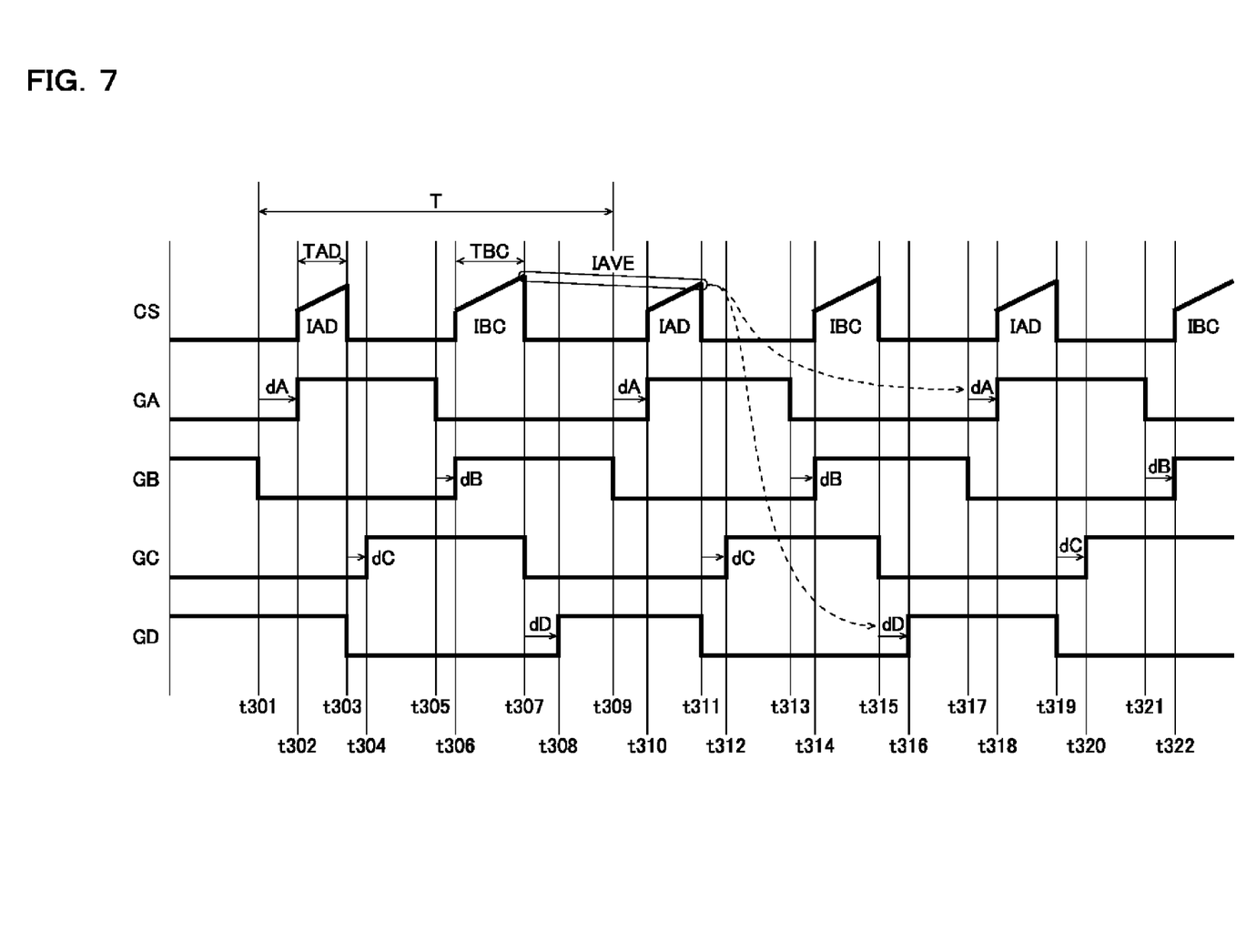
FIG. 7 is a timing chart showing dead-time setting processing in a third mode.

FIG. 7 is a timing chart which shows the dead time setting processing in a third mode (MODE="03"), and the figure illustrates, in order from the top, the sense signal CS and the gate signals GA to GD. In this figure as well, for convenience of description, behaviors of the signals are illustrated without considering the leakage inductance component of the transformer 30.

The switch drive circuit 10 in the third mode sets the simultaneous OFF times of the full-bridge output stage 20 according to the magnitude of an average excitation current IAVE (=(IAD+IBC)/2), which is obtained by averaging the excitation current IAD, which has flown in the first cycle, and the excitation current IBC, which has flown in the second cycle.

For example, in setting the simultaneous OFF times dA and dD which become operation changing factors in the first cycle (for example, from time t318 to time t319) in a period, reference is made to the magnitude of the average excitation current IAVE obtained by averaging the excitation current IAD flown in the first cycle (for example, from time t310 to time 311) in the previous period and the excitation current IBC flown in the second cycle (for example, from time t306 to time t307) in the further previous period (=a period two periods previous to the period). Here, the larger the average excitation current IAVE is, the shorter the switch drive circuit 10 makes the simultaneous OFF times dA and dD (that is, the wider the switch drive circuit 10 makes fixed duties of the gate signals GA and GD in one period), and the smaller the average excitation current IAVE is, the longer the switch drive circuit 10 makes the simultaneous OFF times dA and dD (that is, the narrower the switch drive circuit 10 makes the fixed duties of the gate signals GA and GD).

Thus, when the third mode (MODE="03") is selected, even with variation in characteristics (such as gate delay difference) among the switches TrA to TrD, the simultaneous OFF times dA to dD are made uniform according to the average excitation current IAVE. Thus, as in the above-described second mode, it becomes possible to reduce magnetic deviation of the transformer 30 even without using switch elements among which variation in characteristics is small or additionally providing measures to prevent the magnetic deviation of the transformer 30.

Switching Power Supply Device (Second Embodiment)

Figure 8:
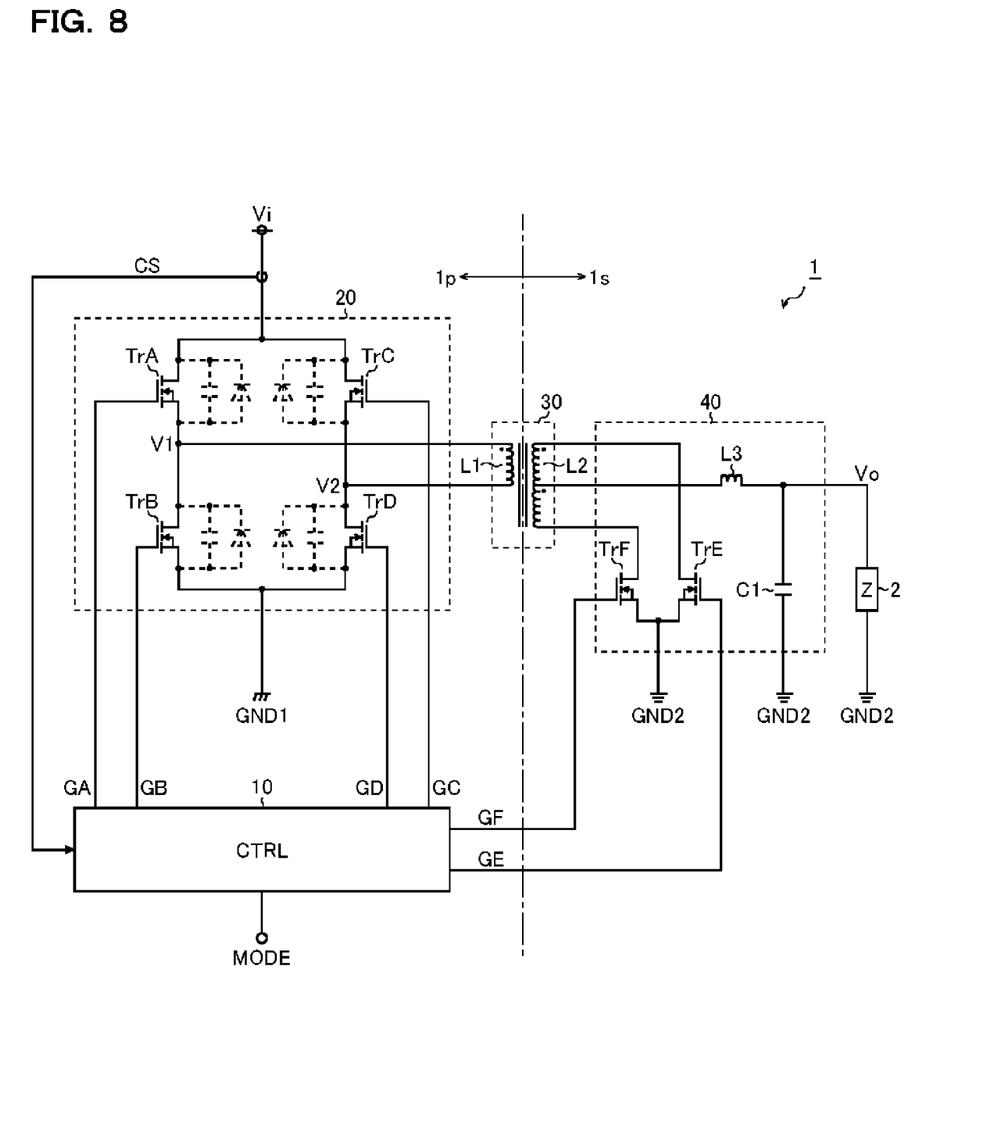
FIG. 8 is a circuit diagram showing a second embodiment of the switching power supply device.

FIG. 8 is a circuit diagram showing a second embodiment of a switching power supply device. A switching power supply device 1 of the present embodiment is based on the first embodiment (FIG. 1), and includes synchronous rectification transistors TrE and TrF as the first and second rectifiers of the rectifying-smoothing unit 40, and the switch drive circuit 10 is configured to drive not only the full-bridge output stage 20 but also the synchronous rectification transistors TrE and TrF. Thus, the same components as those in the first embodiment will be given the same reference symbols as those in FIG. 1, and the following description will focus mainly on specific features of the second embodiment.

The synchronous rectification transistor TrE is connected, instead of the rectifier diode D2 mentioned above, between the second output terminal (=the second terminal of the secondary winding L2) of the transformer 30 and the second ground terminal. On the other hand, the synchronous rectification transistor TrF is connected, instead of the rectifier diode D1 mentioned above, between the first output terminal (=the first terminal of the secondary winding L2) of the transformer 30 and the second ground terminal. The synchronous rectification transistors TrE and TrF are respectively ON/OFF driven according to gate signals GE and GF fed from the switch drive circuit 10. Here, the gate signals GE and GF are transferred from the first circuit system 1p to the second circuit system is via an isolator (not shown) such as a photocoupler.

Figure 9:
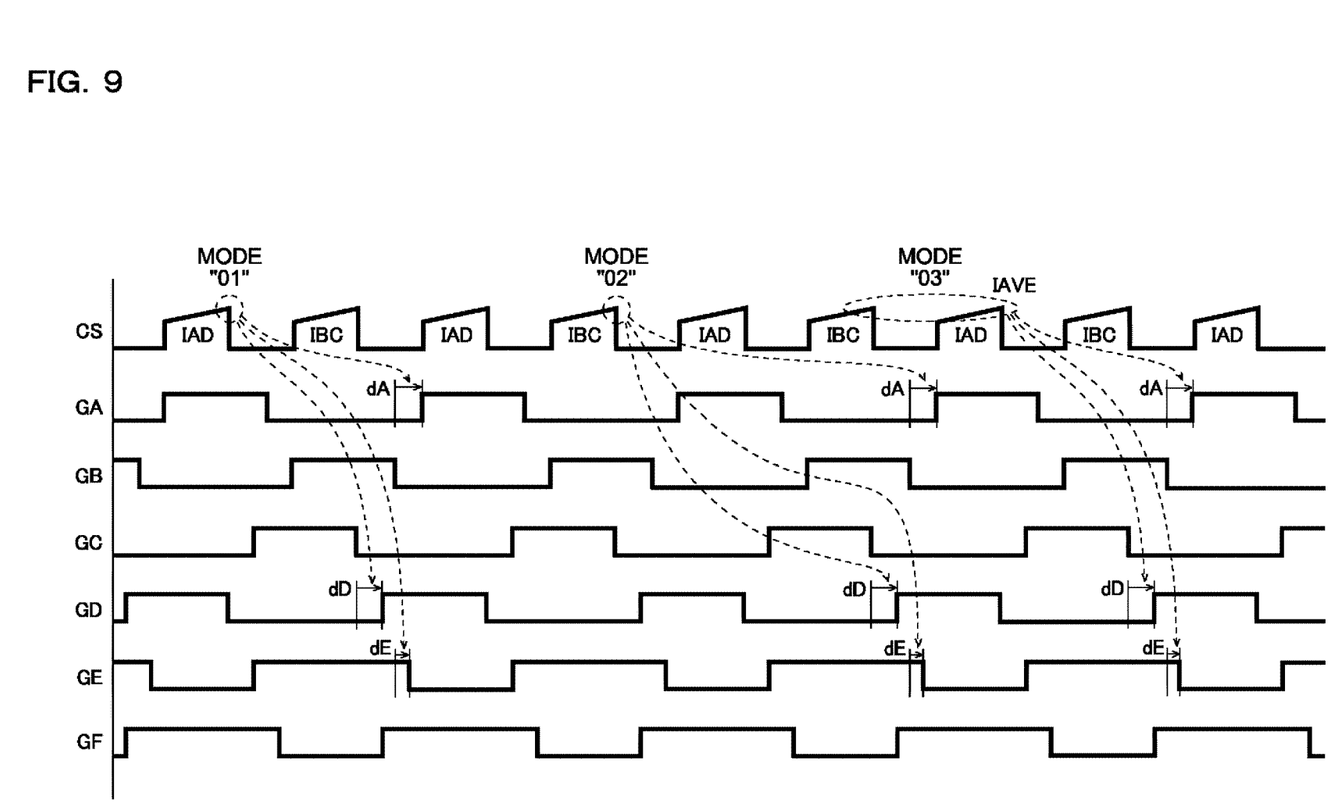
FIG. 9 is a timing chart showing an example of dead-time setting processing.

FIG. 9 is a timing chart which shows an example of the dead time setting processing, and the figure illustrates, in order from the top, the sense signal CS and the gate signals GA to GF. In this figure as well, for convenience of description, behaviors of the signals are illustrated without considering the leakage inductance component of the transformer 30.

As for the synchronous rectification transistor TrE, it needs to be maintained ON while an induction current in accordance with the excitation current IBC is flowing through the secondary winding L2. In view of this, the gate signal GE is raised to a high level without delay when one of the gate signals GB and GC has risen to a high level, and the gate signal GE is let fall to a low level when a predetermined delay time dE has passed after falling down of both the gate signals GB and GC to a low level.

Likewise, the synchronous rectification transistor TrF needs to be maintained ON while an induction current in accordance with the excitation current IAD is flowing through the secondary winding L2. In view of this, the gate signal GF is raised to a high level without delay when one of the gate signals GA and GD has risen to a high level, and the gate signal GF is let fall to a low level when a predetermined delay time dF has passed after falling down of both the gate signals GA and GD to a low level.

Here, like the simultaneous OFF times dA to dD, it is desirable to adjust the lengths of the delay times dE and dF in a setting method (operation mode) in accordance with the operation mode switching signal MODE.

According to the example shown in the present figure, in the first mode (MODE="01"), in setting the simultaneous OFF times dA and dD and the delay time dE, which become operation changing factors in the first cycle in a period, reference is made to the excitation current IAD that has flown in the first cycle in the previous period (a period one period previous to the period).

In the second mode (MODE="02"), in setting the simultaneous OFF times dA and dD and the delay time dE, which are operation changing factors in the first cycle in a period, reference is made to the excitation current IBC that has flown in the second cycle in a period two periods previous to the period.

In the third mode (MODE="03"), in setting the simultaneous OFF times dA and dD and the delay time dE, which become operation changing factors in the first cycle in a period, reference is made to the magnitude of the average excitation current IAVE obtained by averaging the excitation current IAD flown in the first cycle in the previous period (in a period one period previous to the period) and the excitation current IBC flown in the second cycle in the further previous period (=in a period two periods previous to the period).

Other Modified Examples

In addition to the above embodiments, it is possible to add various modifications to the various technical features disclosed herein without departing the spirit of the technological creation.

For example, although the above embodiments have dealt with the switch drive circuit 10 that PWM drives the full-bridge output stage 20 by means of the phase shift method, it is arbitrary whether to adopt the phase shift method in the switch drive circuit 10 or not.

Further, although the above embodiments have dealt with configurations in which it is possible to arbitrarily switch between the three operation modes (the first mode (FIG. 5), the second mode (FIG. 6), and the third mode (FIG. 7)) according to the operation mode switching signal MODE, the first mode is not indispensable, and thus a configuration is possible which allows switching between the second and third modes. Furthermore, the operation mode switching function itself may be omitted, and thus a configuration is possible in which the dead time setting processing in the second or third mode is performed individually.

Thus, it should be considered that the above embodiments are examples in all respects and are not limiting, and that the technical scope of the present invention is not indicated by the above description of the embodiments but by the claims, and all modifications within the scope of the claims and the meaning equivalent to the claims are covered.

INDUSTRIAL APPLICABILITY

The invention disclosed herein can be used in switching power supply devices in general (in particular, those require large electric power, such as in-vehicle power supplies or power supplies for industrial machines).

What is claimed is:

1. A switch drive circuit operable to drive a full-bridge output stage connected to a transformer to alternately switch between a first cycle in which an excitation current in a first direction is supplied to the transformer and a second cycle in which an excitation current in a second direction is supplied to the transformer, wherein in setting a simultaneous OFF time of the full-bridge output stage in accordance with a magnitude of an excitation current flowing in one of the first cycle and the second cycle, the simultaneous OFF time becoming an operation changing factor in another of the first cycle and the second cycle, the larger the excitation current is, the shorter the simultaneous OFF time is made, and the smaller the excitation current is, the longer the simultaneous OFF time is made, wherein in accordance with a magnitude of an excitation current having flowed in the first cycle in a given period, a simultaneous OFF time in the second cycle in a next period is set, and in accordance with a magnitude of an excitation current having flowed in the second cycle in the given period, the simultaneous OFF time in the first cycle in a period after the next period is set.

2. The switch drive circuit according to claim 1, wherein the full-bridge output stage is operable to be PWM driven using a phase shift method.

3. The switch drive circuit according to claim 1, wherein the first cycle of the given period occurs before the second cycle of the given period.

4. A switch drive circuit operable to drive a full-bridge output stage connected to a transformer to alternately switch between a first cycle in which an excitation current in a first direction is supplied to the transformer and a second cycle in which an excitation current in a second direction is supplied to the transformer, the switch drive circuit being operable in:

a mode in which, in setting a simultaneous OFF time of the full-bridge output stage at a time of shifting to one of the first cycle and the second cycle in accordance with a magnitude of an excitation current flowing in another of the first cycle and the second cycle, the larger the excitation current is, the shorter the simultaneous OFF time is made, and the smaller the excitation current is, the longer the simultaneous OFF time is made; and a mode in which, in setting a simultaneous OFF time of the full-bridge output stage in accordance with a magnitude of an average excitation current obtained by averaging an excitation current flowing in the first cycle and an excitation current flowing in the second cycle, the larger the average excitation current is, the shorter the simultaneous OFF time is made, and the smaller the average excitation current is, the longer the simultaneous OFF time is made, wherein switching between the modes is performed in accordance with a mode switching signal, wherein in accordance with a magnitude of an excitation current having flowed in the first cycle in a given period, a simultaneous OFF time in the second cycle in a next period is set, and in accordance with a magnitude of an excitation current having flowed in the second cycle in the given period, the simultaneous OFF time in the first cycle in a period after the next period is set.

5. The switch drive circuit according to claim 4, wherein the full-bridge output stage is operable to be PWM driven using a phase shift method.

6. The switch drive circuit according to claim 4, wherein the first cycle of the given period occurs before the second cycle of the given period.

7. A switching power supply device comprising:

a transformer including a primary winding and a secondary winding which are electromagnetically coupled to each other;

a full-bridge output stage connected between a power supply terminal to which an input voltage is applied and a first ground terminal;

a switch drive circuit operable to drive the full-bridge output stage to alternately switch between a first cycle in which an excitation current in a first direction is supplied to the transformer and a second cycle in which an excitation current in a second direction is supplied to the transformer, wherein in setting a simultaneous OFF time of the full-bridge output stage in accordance with a magnitude of an excitation current flowing in one of the first cycle and the second cycle, the simultaneous OFF time becoming an operation changing factor in another of the first cycle and the second cycle, the larger the excitation current is, the shorter the simultaneous OFF time is made, and the smaller the excitation current is, the longer the simultaneous OFF time is made, the switching power supply device further comprising a rectifying-smoothing unit operable to generate an output voltage from an induction voltage appearing in the secondary winding of the transformer, wherein in accordance with a magnitude of an excitation current having flowed in the first cycle in a given period, a simultaneous OFF time in the second cycle in a next period is set, and in accordance with a magnitude of an excitation current having flowed in the second cycle in the given period, the simultaneous OFF time in the first cycle in a period after the next period is set.

8. The switching power supply device according to claim 7, wherein the full-bridge output stage comprises a first upper switch connected between the power supply terminal and a first terminal of the primary winding, a first lower switch connected between the first terminal of the primary winding and the first ground terminal, a second upper switch connected between the power supply terminal and a second terminal of the primary winding, and a second lower switch connected between the second terminal of the primary winding and the first ground terminal.

9. The switching power supply device according to claim 7, wherein the rectifying-smoothing unit includes a first rectifier connected between a first terminal of the secondary winding and a second ground terminal, a second rectifier connected between a second terminal of the secondary winding and the second ground terminal, a choke coil a first terminal of which is connected to a middle point tap of the secondary winding and a second terminal of which is connected to an output-voltage output terminal, and a smoothing capacitor a first terminal of which is connected to the output-voltage output terminal and a second terminal of which is connected to the second ground terminal.

10. The switching power supply device according to claim 9, wherein the first rectifier and the second rectifier are rectifier diodes.

11. The switching power supply device according to claim 9, wherein the first rectifier and the second rectifier are synchronous rectification transistors, and the switch driving circuit drives the full-bridge output stage together with the synchronous rectification transistors.

12. The switching power supply device according to claim 7, wherein the first cycle of the given period occurs before the second cycle of the given period.

13. A switching power supply device comprising:
- a transformer including a primary winding and a secondary winding which are electromagnetically coupled to each other;
- a full-bridge output stage connected between a power supply terminal to which an input voltage is applied and a first ground terminal;
- a switch drive circuit operable to drive the full-bridge output stage to alternately switch between a first cycle in which an excitation current in a first direction is supplied to the transformer and a second cycle in which an excitation current in a second direction is supplied to the transformer, the switch drive circuit being operable in:
  - a mode in which, in setting a simultaneous OFF time of the full-bridge output stage at a time of shifting to one of the first cycle and the second cycle in accordance with a magnitude of an excitation current flowing in another of the first cycle and the second cycle, the larger the excitation current is, the shorter the simultaneous OFF time is made, and the smaller the excitation current is, the longer the simultaneous OFF time is made; and
  - a mode in which, in setting a simultaneous OFF time of the full-bridge output stage in accordance with a magnitude of an average excitation current obtained by averaging an excitation current flowing in the first cycle and an excitation current flowing in the second cycle, the larger the average excitation current is, the shorter the simultaneous OFF time is made, and the smaller the average excitation current is, the longer the simultaneous OFF time is made,
- wherein switching between the modes is performed in accordance with a mode switching signal,
- the switching power supply device further comprising a rectifying-smoothing unit operable to generate an output voltage from an induction voltage appearing in the secondary winding of the transformer,
- wherein in accordance with a magnitude of an excitation current having flowed in the first cycle in a given period, a simultaneous OFF time in the second cycle in a next period is set, and in accordance with a magnitude of an excitation current having flowed in the second cycle in the given period, the simultaneous OFF time in the first cycle in a period after the next period is set.

14. The switching power supply device according to claim 13, wherein the full-bridge output stage comprises
- a first upper switch connected between the power supply terminal and a first terminal of the primary winding,
- a first lower switch connected between the first terminal of the primary winding and the first ground terminal,
- a second upper switch connected between the power supply terminal and a second terminal of the primary winding, and
- a second lower switch connected between the second terminal of the primary winding and the first ground terminal.

15. The switching power supply device according to claim 13, wherein the rectifying-smoothing unit includes
- a first rectifier connected between a first terminal of the secondary winding and a second ground terminal,
- a second rectifier connected between a second terminal of the secondary winding and the second ground terminal,
- a choke coil a first terminal of which is connected to a middle point tap of the secondary winding and a second terminal of which is connected to an output-voltage output terminal, and
- a smoothing capacitor a first terminal of which is connected to the output-voltage output terminal and a second terminal of which is connected to the second ground terminal.

16. The switching power supply device according to claim 15, wherein the first rectifier and the second rectifier are rectifier diodes.

17. The switching power supply device according to claim 15, wherein
- the first rectifier and the second rectifier are synchronous rectification transistors, and
- the switch driving circuit drives the full-bridge output stage together with the synchronous rectification transistors.

18. The switching power supply device according to claim 13, wherein the first cycle of the given period occurs before the second cycle of the given period.

* * * * *